Oct. 25, 1938.   J. ZIMKA ET AL   2,134,387
REVERTED DRIVE AUTOMOTIVE VEHICLE
Filed Feb. 26, 1938
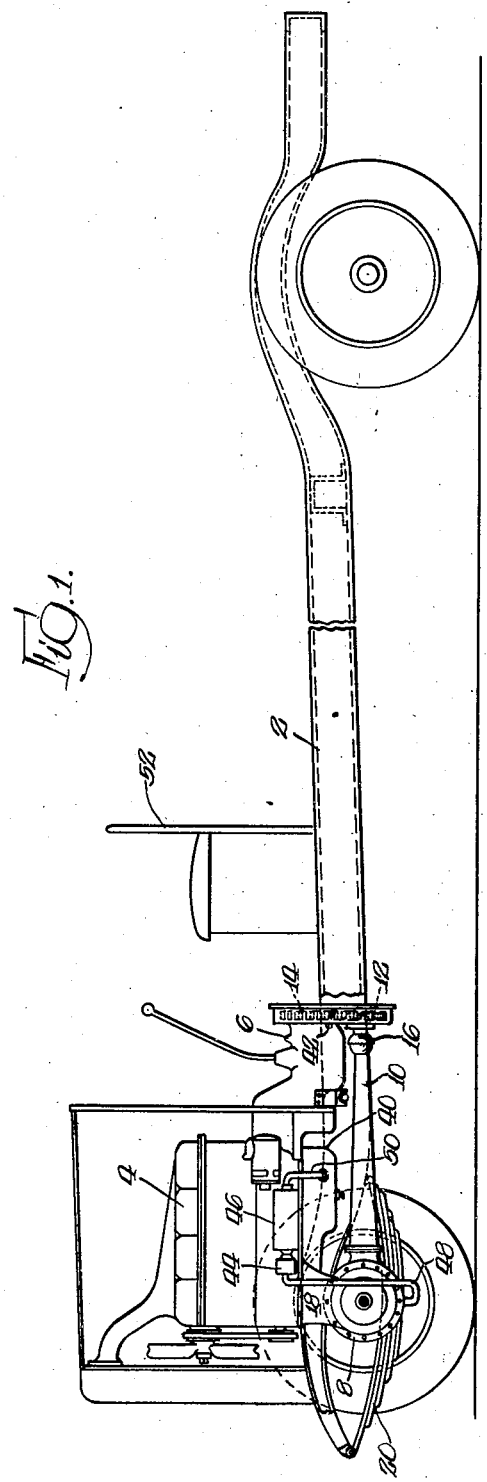
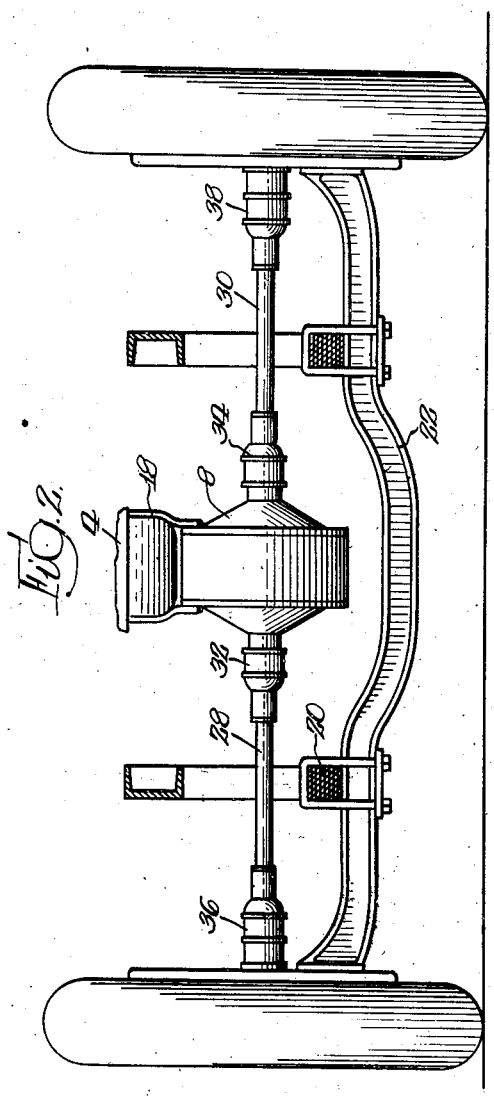
Inventors:
John Zimka,
Frank Miller,
By Richard Spencer
Atty.

Patented Oct. 25, 1938

2,134,387

UNITED STATES PATENT OFFICE 2,134,387

REVERTED DRIVE AUTOMOTIVE VEHICLE

John Zimka, Chicago, and Frank Miller, Highland Park, Ill.

Application February 26, 1938, Serial No. 192,708

1 Claim. (Cl. 180—42)

This invention relates to a new and improved type of automotive vehicle and more particularly to a vehicle having a front wheel drive.

In the ordinary type of truck the body of the vehicle is generally relatively high from the ground, as, for instance, from about two and one-half to about three feet. This is caused to a large extent by the fact that most trucks have a drive shaft running through the center of the truck from the engine in the front to a differential mounted on the axle in the rear. In order to provide a flat floor space in the body of the truck it is necessary to elevate it above this drive shaft. The driver's compartment in such trucks is usually on a different level from the carrier portion of the truck, and no means are provided by which the driver may walk directly from his compartment through the carrier portion of the truck without stooping.

On account of the distance of the truck floor from the ground, most trucks of the type used in delivering bakery products, milk and other commodities which may be stacked or arranged on shelves within the truck have an overall height of at least eight feet and a step or running board is usually required in order for the driver to reach his compartment.

Front wheel drive trucks are well known and various arrangements of front wheel drives have been described. Many of the arrangements heretofore described, however, are not suitable for making a truck which can be sold and used for delivering bread and similar products. Furthermore, in previously described trucks of the front wheel drive type in which the wheels are driven through a single drive shaft, it has been customary to mount the differential on the front axle, independently of the motor. This has the disadvantage of placing a large amount of dead weight on the front axle.

One of the objects of the present invention is to provide a new and improved type of truck which has a low body structure and a low overall height.

A further object is to provide a truck suitable for use in carrying bakery products, milk and similar commodities in which the driver can enter his driver's compartment without the necessity for an extra step or running board, and which is so constructed that the driver's compartment and the carrier portion of the truck are on the same floor level, and the driver can readily go from one to the other without stooping.

Another object of this invention is to provide a new and improved type of reverted front wheel drive for automotive vehicles in which a differential is mounted integrally with the motor or engine and independently of the front axle whereby the weight of the differential is all substantially sprung weight rather than dead weight.

Other objects will appear from a reading of the following specification as the description proceeds.

In accordance with this invention we provide an automotive reverted front wheel drive in which the transmission, engine or motor and differential form a single unit. As a further feature the differential is not mounted directly upon the front axle but independently thereof. Still a further feature of the invention resides in the provision of an integral unit comprising the engine or motor, differential and transmission in which a lubricant can be continuously circulated from the engine through the transmission, drive shaft and differential and from there back to the engine, preferably after first being pumped to a suitable reservoir.

The novel features and structures of said invention, together with the advantages thereof, will be more fully understood from a reading of the following specification in conjunction with the accompanying drawing in which:

Figure 1 represents a side view of a truck chassis showing the engine and driving mechanism mounted on the front part thereof; and Figure 2 represents a front view of the differential and front axle.

Referring to Figure 1, the truck illustrated comprises a frame or chassis 2, shown with parts broken away, an engine 4, a transmission 6, a differential 8 and a driving or propeller mechanism generally illustrated at 10.

The drive shaft or propeller mechanism 10 is connected through gears 12 and 14 to a drive shaft, not shown, located in the transmission. The connection between the drive shaft or propeller mechanism 10 and gear 12 is effected by means of a universal coupling 16. No universal coupling is required, however, between the propeller or drive mechanism 10 and differential 8, as is sometimes the case in cars or trucks provided with a rear wheel drive.

As shown, engine 4 and transmission 6 are integrally connected and if desired, may be cast in a single block. Differential 8 is likewise integrally connected to engine 4 by means of a metal sheath 18 which is bolted directly to the engine block and to the top of the differential housing. It will be recognized that differential 8 and the oil pan of engine 4 may be cast or stamped in a single unit.

The engine shown is a conventional type of engine such as is ordinarily used in automotive vehicles having a rear wheel drive. It is mounted on rubber mountings preferably with a three point suspension. The transmission is also a conventional transmission, and the differential may be a differential similar to that used on a rear wheel drive except that it is in reversed position. Chassis 2 and springs 20 are also conventional.

As illustrated in Figure 2, front axle 22 is independent of differential 8, being fastened to the frame by springs 20. The front wheels are driven from differential 8 through driving axles 28 and 30. Driving axles 28 and 30 are provided with single acting universal couplings 32 and 34 and double acting universal couplings 36 and 38, respectively.

Turning again to Figure 1, a preferred embodiment of the invention involves the provision of an oil distributing system made possible by the combined engine, transmission and differential unit. According to this system, oil is pumped directly from oil reservoir 40 through the drive shaft of the transmission, not shown, thence through an outlet in the transmission generally illustrated at 42 to the housing for gears 12 and 14, thence through universal coupling 16 and the torque tube and drive shaft assembly 10 to differential 8. From the bottom of differential 8 oil is pumped by means of a pump 44 to a secondary reservoir 46 from whence it is returned to the engine at a convenient point either to the main reservoir or to one of the main bearings. Conduits 48 and 50 are provided to carry the oil or lubricant according to this embodiment of the invention as illustrated in Figure 1. No other conduits are necessary since the compact arrangement makes lubrication relatively simple. The lubricating system described above has the advantage that it is unnecessary to lubricate independently transmission 6, gears 12 and 14, universal coupling 16, propeller shaft assembly 10 and differential 8. All of these parts can be lubricated with the same lubricant employed in the engine with the addition of only a single oil pump and preferably also a secondary oil reservoir.

The operation of a reverted drive mechanism such as described above is relatively simple. Gear 14 is driven through a drive shaft from the motor, the speed and motion of which is regulated by transmission 6. Gear 12 is in turn driven by gear 14. Gear 12 drives a propeller shaft located in torque tube 10 which is connected through a universal coupling 16. This propeller shaft in turn drives the differential gears located in differential 8. These in turn drive axles 28 and 30 which drive the wheels. It will be observed that the propeller shaft in torque tube 10 is substantially in the same plane as the front axle, thus making it possible to use a conventional type differential. Axles 28 and 30 and the single acting and double acting universal couplings associated therewith are conventional equipment. Double acting universal couplings 36 and 38 are employed in order to obtain greater turning radius. Inasmuch as differential 8 is integrally associated with engine 4 which in turn is integrally associated with transmission 6 and front axle 22 is independent of this integral unit, substantially all of the weight in the car is sprung weight rather than dead weight. This is a result which automobile manufacturers recognize to have many advantages.

As illustrated in Figure 1, driver's seat 52 is mounted directly back of the housing for gears 14 and 12. The floor of the truck may be mounted substantially flush with the frame 2 which is impossible with the ordinary type of rear wheel drive unless there is a substantial ridge in the center of the truck through which the drive shaft housing runs. With the arrangement described above a passage may be provided beside the driver's seat leading to the rear or carrying portion of the truck. Thus, it is possible for the driver to move about the truck from front to rear on the same floor level, a factor greatly tending to increase the safety of this type of truck. In the ordinary type of truck the distance from the ground to the floor level is usually about thirty-four inches or more. In the type of truck herein described, this distance may be reduced to eighteen inches. This reduction in distance between the floor level and the ground makes it possible to manufacture a truck in which the overall height is substantially less than in previous trucks for the same carrying capacity. Furthermore, it is thus possible to provide a truck in which the driver can stand upright without requiring an increase in the height of the truck.

It will be apparent that variations may be made in the apparatus herein described without departing from the invention. For example, the auxiliary lubricating system previously described may be varied by varying the point at which conduit 50 returns the oil to the engine. Furthermore, instead of having the lubricant flow directly from engine 4 to transmission 6 a conduit can be connected directly from engine 4 to the housing for gears 12 and 14 thereby omitting transmission 6 from the circulation system, since it may be desired to provide a different type of oil in the transmission. Other changes in mechanical details will also be apparent to those skilled in the art. One of the important advantages of the invention lies in the fact that it makes use of standard parts, the arrangement of these parts making possible a result which has not heretofore been obtained.

A further advantage of our invention lies in the fact that the engine is conventionally mounted with the transmission in the rear thereby eliminating remote control for gear shifting which is necessary in certain types of front wheel drive automotive vehicles.

Having thus described the invention, what we claim as new and desire to secure by Letters Patent of the United States is:

In a front wheel drive mechanism for automotive vehicles, the combination of an engine, a change speed gear transmission mounted in the rear of said engine and integral therewith, a differential directly beneath and integrally united to the forward part of said engine, drive axles between the differential and the front wheels, and propeller shaft means mounted independently of the engine and below the same and associated through gearing with said transmission and said differential for driving the front wheels of the vehicle, said propeller shaft means being disposed substantially in the same horizontal plane as the drive axles.

JOHN ZIMKA.
FRANK MILLER.